(12) United States Patent
Thead et al.

(10) Patent No.: US 6,298,834 B1
(45) Date of Patent: *Oct. 9, 2001

(54) FUEL VAPORIZING ATTACHMENT FOR LIQUID FUELED INTERNAL COMBUSTION ENGINES

(75) Inventors: William H. Thead, Atlanta; William H. Scalia, Jr.; Randall S. Hamilton, both of Dawsonville, all of GA (US)

(73) Assignee: Safe Energy Systems, Inc., Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,420

(22) Filed: Apr. 22, 1998

(51) Int. Cl.[7] .................................................. F02M 31/02
(52) U.S. Cl. .................................................................. 123/549
(58) Field of Search .................................. 123/549, 557, 123/553

(56) References Cited

U.S. PATENT DOCUMENTS

| | | | |
|---|---|---|---|
| 1,280,787 | * | 10/1918 | McCurtain ............................ 123/549 |
| 1,603,660 | * | 10/1926 | Cassella ................................ 123/549 |
| 4,201,167 | | 5/1980 | Bayley . |
| 4,244,188 | | 1/1981 | Joy . |
| 4,333,739 | | 6/1982 | Neves . |
| 4,350,133 | | 9/1982 | Greiner . |
| 4,375,799 | * | 3/1983 | Swanson ............................... 123/549 |
| 4,378,001 | * | 3/1983 | Takeda et al. ....................... 123/549 |
| 4,407,238 | | 10/1983 | Yoon . |
| 4,419,967 | | 12/1983 | Protacio . |
| 4,429,534 | | 2/1984 | Joy . |
| 4,480,622 | | 11/1984 | Hoffman . |
| 4,499,863 | | 2/1985 | Gandhi et al. . |
| 4,716,859 | | 1/1988 | Konig et al. . |
| 4,762,093 | | 8/1988 | McCabe et al. . |
| 4,967,706 | * | 11/1990 | Van Wechem et al. ............. 123/549 |
| 5,038,725 | * | 8/1991 | Okazaki et al. ..................... 123/549 |
| 5,040,518 | | 8/1991 | Hamm . |
| 5,078,115 | * | 1/1992 | Yamashita et al. .................. 123/549 |
| 5,086,747 | * | 2/1992 | Curhan ................................. 123/549 |
| 5,134,986 | * | 8/1992 | Curhan ................................. 123/549 |
| 5,140,966 | | 8/1992 | Wong . |
| 5,154,154 | * | 10/1992 | Henke et al. ........................ 123/549 |
| 5,325,836 | | 7/1994 | Orzel . |
| 5,372,115 | | 12/1994 | Straub et al. . |
| 5,850,822 | * | 12/1998 | Romann et al. ..................... 123/549 |
| 5,873,354 | * | 2/1999 | Krohn et al. ......................... 123/549 |
| 6,053,153 | * | 4/2000 | Moser et al. ......................... 123/549 |
| 6,058,915 | * | 5/2000 | Abidin et al. ........................ 123/549 |

* cited by examiner

*Primary Examiner*—Marguerite McMahon
(74) *Attorney, Agent, or Firm*—Womble Carlyle Sandridge & Rice

(57) ABSTRACT

A fuel vaporizing attachment for vaporizing fuels used to power a liquid fueled internal combustion engine. Conventional liquid fueled, internal combustion engines typically include at least one fuel line, at least one fuel metering device, at least one air intake, at least one cylinder and at least one heat source, such as an exhaust manifold, a radiator or a battery. The fuel vaporizing attachment is disposed on the fuel line proximate the metering device. The fuel vaporizing attachment includes at least one fuel conduit disposed between the fuel metering device and the air intake for enabling the flow of fuel therebetween, and at least one medium for transferring heat from at least one heat source to the fuel conduit such that the fuel conduit is heated and fuel passing through the fuel conduit is vaporized prior to entering the at least one air intake of the engine.

29 Claims, 10 Drawing Sheets

FUEL VAPORIZING ATTACHMENT FOR LIQUID FUELED INTERNAL COMBUSTION ENGINES

TECHNICAL FIELD

This invention relates to the field of fuels and fuel burning systems which power internal combustion engine-driven devices. More specifically, this invention relates to a fuel vaporizing attachment for a liquid fueled internal combustion engine which enables the improved burning of conventional and alternative fuels so as to significantly reduce the emission of pollutants into the atmosphere.

BACKGROUND ART

In the field of fuels and fuel burning systems, significant research and development is being undertaken to improve the burning efficiency of conventional fuels such as gasoline, diesel and blended fuels, typically used in the operation of internal combustion engines. The focus of this research is in the development of combustion engines which are powered by conventional gasoline and diesel burning fuels, as well as those which can be powered by alternative fuels, particularly methanol and ethanol. The ultimate objective is the creation of an engine which has an optimized fuel burning efficiency and which produces emissions that are free or nearly free of harmful pollutants or which is capable of operation using conventional or alternative fuels. Exemplary of such research is Daimler-Benz's introduction fuel-cell powered, pollutant-free Minivan prototype in 1996, as described in June 1996 issue of the *Hydrogen & Fuel Cell* Letter, Vol. XI, No.6.

Notwithstanding such research in alternative energy vehicles, there remains significant potential for the application of conventional fuels given a fundamental understanding and proper application of fuel burning principles. These fundamental principles are derived from the first law of thermodynamics and what is common known today as the "Carnot Cycle". Briefly stated, this concept provides that the efficiency of a fuel burning engine can be expressed as a ratio of two temperatures $T_{in}$ (temperature of air/fuel mixture immediately before combustion) and $T_{ex}$ (highest temperature of mixture reached during the combustion process). In turn, the maximum efficiency for an engine operating between these two temperatures can be expressed by the equation:

$$\text{Efficiency} = 1 - \frac{T_{ex}}{T_{in}}$$

Given this relation, it is clear that the lower the value for the input temperature, $T_{in}$, and the greater the difference between $T_{ex}$ and $T_{in}$, the greater the efficiency of the combustion engine.

Other research performed in the area of fuels and fuel burning systems have not yielded the desired results. The problems which have slowed the evolution of such engines have tended to focus about ineffective fuel conversion methods, inefficient fuel burning and inconsistent emissions results which are a logical result of inefficient fuel conversion and fuel burning. Among the devices typical of this art are those disclosed in the following U.S. Patents:

| U.S. Pat. No. | Inventor(s) | Issue Date |
| --- | --- | --- |
| 4,201,167 | R. I. Bayley | May 6, 1980 |
| 4,244,188 | J. R. Roy | Jan. 13, 1981 |
| 4,350,133 | L. Greiner | Sep. 21, 1982 |
| 4,333,739 | A. M. Neves | Jun. 8, 1982 |
| 4,407,238 | H. Yoon | Oct. 4, 1983 |
| 4,419,967 | A. C. Protacio, et al. | Dec. 13, 1983 |
| 4,429,534 | J. R. Joy | Feb. 7, 1984 |
| 4,480,622 | P. H. Hoffman | Nov. 6, 1984 |
| 4,499,863 | H. S. Gandhi, et al. | Feb. 19, 1985 |
| 4,716,859 | A. König, et al. | Jan. 5, 1988 |
| 4,762,093 | R. W. McCabe, et al. | Aug. 9, 1988 |
| 5,040,518 | M. W. Hamm | Aug. 20, 1991 |
| 5,140,966 | M. L. Wong | Aug. 25, 1992 |
| 5,325,836 | D. V. Orzel, et al. | Jul. 5, 1994 |
| 5,372,115 | R. D. Straub, et al. | Dec. 13, 1994 |

The fundamental concepts underlying the majority of these prior art devices fail to consider the utilization of conventional fuels and are predicated on the requirement that methanol or ethanol based fuels be utilized in operation of the internal combustion engines of conventional motor vehicles. The '167patent issued to Bayley, the '188 and'534 patents issued to Joy, the '238 patent to issued Yoon, the '133 patent issued to Greiner, the '739 patent issued to Neves, the '967 patent issued to Protadio, the '863 patent issued to Gandhi, the '859 patent issued to König, the '093 patent issued to McCabe and the '115 patent issued to Straub, are exemplary of the devices relying on such concepts. None of these devices are adaptable for use in combustion engine systems which utilize conventional benzene-based fuels. Consequently, none of these devices can be retrofitted onto existing engines. As these devices fail to consider the continued use of benzene-based fuels, they also fail to address the resource and environmental concerns raised by continued use of benzene based fuels. None of these devices are fabricated to be adapted to the engines of vehicles capable of using more than one fuel type. Moreover, several of these devices require the inclusion of numerous and/or distinct parts not heretofore utilized on conventional combustion engines such that expensive and/or extensive adaptations are required for their use in internal combustion engines in use on the roads today.

The most relevant of the devices in the prior art are those disclosed in the '622 patent issued to Hoffman, the '518 patent issued to Hamm, and the '66 patent issued to Wong. The Hoffman device consists of a longitudinal, centrally disposed tube having a series of smaller tubes disposed about its outer surface. Conceptually, the Hoffman device is distinguishable from the present invention as its operation is not only contrary to that of the present invention as well as the principles supporting the Carnot cycle.

In operation, the Hoffman device requires that the air be heated by exhaust gases before mixing with the fuel and again after mixing when it is in combination with the fuel. Vaporization then occurs when the mixture is passed through the peripherally disposed smaller tubes and exposed to heat emanating from exhaust gases which are flowed through the central disposed tube. The steps of pre-heating the air both before mixture and at vaporization elevates the pre-combustion temperature of the air-fuel mixture such that the pre- and post-combustion temperature differential is reduced and the burning efficiency, as described by application of the Carnot cycle, is reduced.

Practically, the Hoffman device is also ineffective as a vaporizer as the disposal of the heated fuel mixture in a series of tubes disposed about the periphery of the device fails to insure the continued vaporized fuel state of the mixture. It fails to enable the vaporization of the fuel mixture in specific and numerous locations, such as in the individual ports of the multiport fuel injection systems which are being fabricated for the engines of vehicles for today and in the future. Moreover, the Hoffman device fails to provide a manner for vaporizing fuel proximate its entry into the air flow and cannot be adapted to fuel systems which use alternative fuels to power the engine.

The Hamm device includes a plurality of tubes having a plurality of fins disposed in a perpendicular relation relative to the plurality of tubes. Exhaust gases passing through the tubes heats the tubes and fins as fuel and air is passed over the fins and over the tubes. The Hamm device is ineffective as a complete fuel vaporizer as the fin-and-tube arrangement is inefficient in vaporizing fuel. Structurally, it makes no provision for a uniform exposure of heat to the fuel passing between the fins. It fails to avoid the accumulation of fuel on either or both the fins and tubes from a failure in vaporization. The Hamm device fails to provide a manner for vaporizing fuel before mixing with the air flow of the motor. It is also unadaptable for use with fuel systems powered by alternative fuels.

The Wong device is distinguishable in that it requires the use of a computer for regulation of the fuel mixture composition, an ultrasonic transducer to initially break-up the liquid prior to vaporization, and other adaptations of component parts to insure its operability. Similarly, the Wong device fails to provide for a manner for vaporizing fuel proximate its entry into the air flow of the motor. It, too, is unadaptable for use with fuel systems powered by alternative fuels.

As discussed in part above, fuel vaporization is a process of particular interest to those skilled in the art as it represents a process for increasing fuel efficiency and optimizing burning efficiency by creation of fuel vapor. Vaporized fuel has a greater burning capacity than an equal amount of fuel in a single drop due to the increased surface area provided by the vaporized, smaller droplets. A smaller size fuel droplet enables a greater fuel burn because the likelihood that the entire fuel droplet is consumed on combustion rather than just the outer surface, or just a portion, of the outer drop is dramatically increased. The increased burning capacity of vaporized fuel also enables a greater burning efficiency of the vaporized fuel and a more effective fuel burning process, resulting in a decrease in the amount of fuel needed to operate the combustion engine as well as the residual, pollutant elements are to released to the environment. Greater resource conservation is also achieved as pollutant emissions are greatly reduced and natural resources are conserved, as well.

A primary objective in designing fuel vaporizing systems is constructing those systems so as to be adaptable to the existing structure of conventional internal combustion engines. Chief among the considerations in such systems to conventional engines is the ability to utilize media currently being employed in such motors as well as other non-conventional media. Among those media conventionally employed in internal combustion engines are electricity and latent heat. The fuel vaporizing attachment of the present invention is adaptable for utilizing both electricity and latent heat. Heat generated from the electricity produced by a conventional engine battery can be employed as a method of heating the fuel vaporizer to a level sufficient to vaporize the fuel passing through a fuel channel. Alternatively, heat generated by operation of the combustion engine, derived from the exhaust manifold and/or the cooling system is employable for heating the fuel vaporizer such that the fuel passing through the channel is vaporized. In either instance, the fuel vaporizing attachment is positioned on the engine such that the fuel is passed through a fuel metering device, such as the carburetor of a conventional, non-fuel injected engine or the fuel injector of a conventional, fuel injected engine, then heated and vaporized by the fuel vaporizing attachment and then inserted into the air flow.

The use of electrically generated and latent heat in conjunction with conventionally employed fuel metering devices is preferred for operation of the fuel vaporizing attachment of the present invention as they provide the greatest adaptability of the present invention to internal combustion engines, regardless of the time of adaptation; at the time of the engine's original manufacture or in an after-market retrofitting. Use of electrical heat produced by the vehicle battery or latent heat carried by the existing exhaust and cooling system, provides additional benefits as well. It allows the fuel to be metered while still in the liquid state and be more easily managed than vaporized fuel. It also allows the fuel to be vaporized prior to its introduction into the air flow, thereby conserving the efficiency of cold intake air, and reducing the amount of heat needed to vaporize the fuel. The fuel vaporizing attachment vaporizes the fuel using wasted heat energy, rather than requiring the installation of separate components to production of extra energy, such as by the technology contemplated by Mercedes Benz. Moreover, it allows fuel to be vaporized using many of the devices already integrated into the existing engine designs including, for example, water pumps, computerized fuel management systems, and intake manifolds.

Therefore, it is an object of this invention to provide a fuel vaporizing attachment which completely vaporizes liquid fuel before the fuel is supplied to the air flow of an internal combustion engine so that a more complete combustion of fuel occurs.

Another object of the present invention is to provide a fuel vaporizing attachment which vaporizes liquid fuel to provide a uniformly mixed air fuel mixture and a better quality air fuel mixture so that a more complete fuel combustion occurs, fuel efficiency is increased and the emission of harmful pollutants is reduced.

Yet another object of the present invention is to provide a fuel vaporizing attachment which is easily adaptable or retrofittable to internal combustion engines as presently constructed.

It is also an object of the present invention to provide a fuel vaporizing attachment which is adaptable to fuel injected and non-fuel injected internal combustion engines, alike.

Another object of the present invention is to provide a fuel vaporizing attachment which is adaptable to internal combustion engines for powering diverse types of devices including, but not limited to automobiles, motorcycles, lawnmowers, generators, welders, chain saws, and weedeaters.

Yet another object of the present invention is to provide a fuel vaporizing device which is adaptable for vaporizing fuels that power motors regardless of the type of fuel used.

Further, it is an object of the present invention to provide a fuel vaporizing device which is simple and economical to construct.

It is an object of the present invention to provide a means for vaporizing the fuel proximate the metering device before introduction into the air flow and permit the metering by more than one metering device such as utilized by multiport inject cars.

DISCLOSURE OF THE INVENTION

Other objects and advantages will be accomplished by the fuel vaporizing attachment for liquid fueled internal combustion engines of the present invention. The fuel vaporizing attachment significantly increases the operating efficiency of engines such that fuel consumption is optimized, fuel economy is increased, and natural resources are conserved. Moreover, the fuel vaporizing attachment improves the burning of fuels used in internal combustion engines such that a distinct reduction in air pollutants is achieved.

Conventional liquid fueled, internal combustion engines typically include at least one fuel line, at least one fuel metering device, at least one air intake, at least one cylinder and at least one heat source, such as an exhaust manifold, a radiator or a battery. The fuel vaporizing attachment is disposed on the fuel line proximate the metering device. The fuel vaporizing attachment includes at least one fuel conduit disposed between the fuel metering device and the air intake for enabling the flow of fuel therebetween, and at least one medium for transferring heat from at least one heat source to the fuel conduit such that the fuel conduit is heated and fuel passing through the fuel conduit is vaporized prior to entering the at least one air intake of the engine. The fuel conduit includes a fuel conduit inlet to and a fuel conduit outlet from a fuel channel.

In a first embodiment, the engine is a single cylinder, liquid fueled internal combustion engine having a fuel line, a metering device and an air intake. The fuel vaporizing attachment includes a fuel conduit disposed on a fuel line between the fuel metering device and the air intake. The fuel conduit is positioned proximate the engine such that the walls of the conduit are in contact with the engine. Heat energy is transferred from the engine through the walls of the conduit such that fuel passing through the fuel channel is vaporized before it enters the air intake of the engine.

In a second embodiment, the engine is a multi-cylinder, liquid fueled internal combustion engine having at least one fuel line, at least one fuel metering device, at least one air intake and at least one heat source. The fuel vaporizing attachment includes at least one fuel conduit disposed on the fuel line between one of the at least one fuel metering devices and one of the at least one air intakes of the engine and two mediums which cooperate to transfer heat energy from at least two heat sources to the at least one fuel conduit. The first medium transfers heat energy from the first source to the second heat source. The second medium transfers heat energy from the second heat source to the fuel conduit such that the fuel conduit is heated and fuel passing therethrough is vaporized prior to entering the at least one air intake of the engine.

In another embodiment, the engine is a multi-cylinder, liquid fueled internal combustion engine having at least one fuel line, at least one metering device, at least one air intake and several heat sources, as are conventionally available on such an engine. The fuel vaporizing attachment includes at least one fuel conduit disposed on one of at least one the fuel lines between one of the at least one fuel metering devices and one of at least one air intake of the engine and two mediums which transfer heat energy from any one of the several heat sources to the at least one fuel conduit. The two mediums are usable independently or in combination to heat one of the at least one fuel conduit such that the fuel passing therethrough is vaporized prior to entering the at least one air intake of the engine.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A fuel vaporizing attachment for a liquid fueled internal combustion engine incorporating various features of the present invention is illustrated generally at 10 in the figures. The fuel vaporizing attachment 10 improves the burning of fuels used to power these engines and increases their operating efficiency such that fuel economy is increased, fuel consumption is reduced and related natural resources are conserved. Use of the fuel vaporizing attachment 10 also achieves a distinct reduction in the air pollutants produced in the burning of these fuels.

Figure 1:
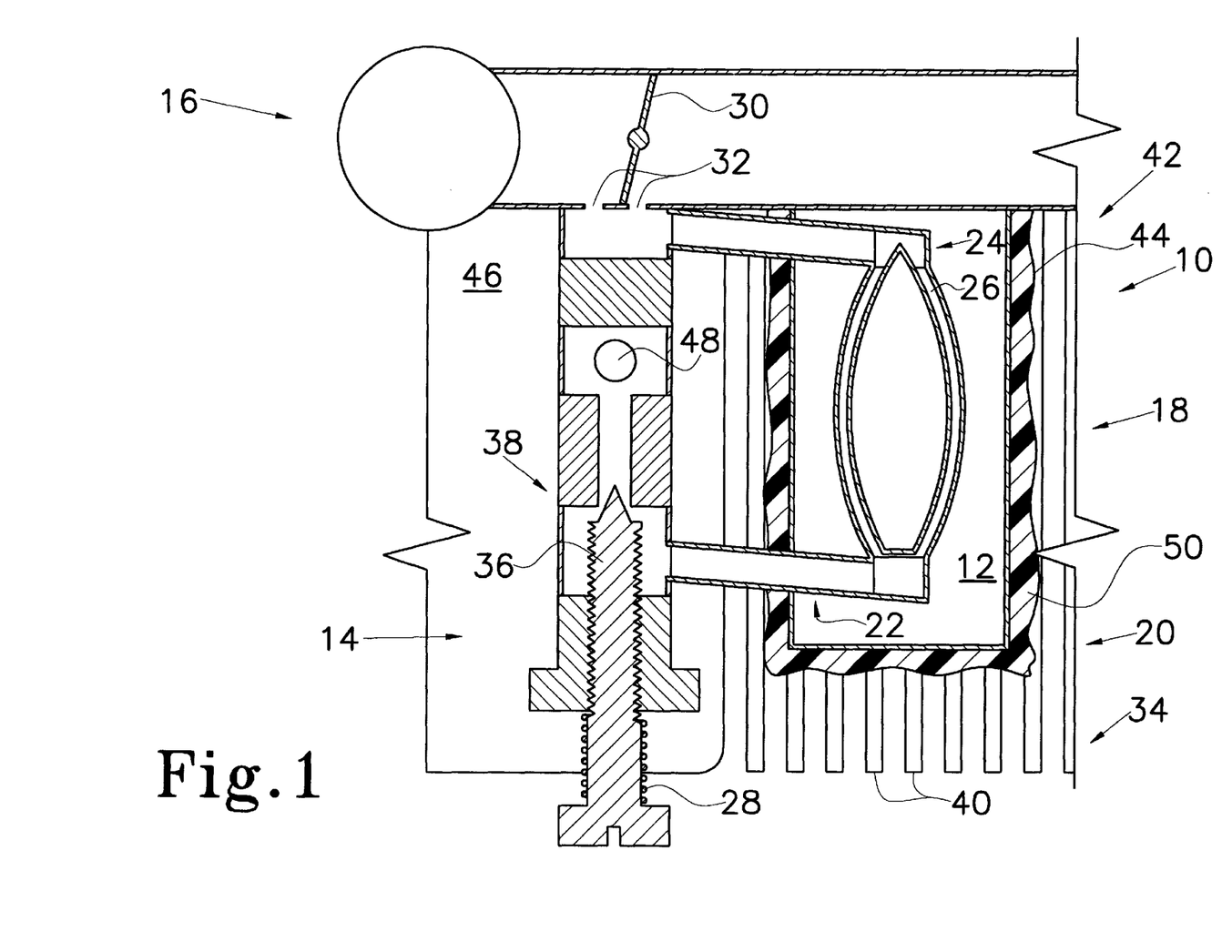
FIG. 1 is a top plan view of a first embodiment of the fuel vaporizing attachment, partially in section, constructed in accordance with several features of the present invention.

The fuel vaporizing attachment 10 is disposed on the fuel line of a conventional, liquid fueled, internal combustion engine. FIG. 1 illustrates a perspective view of a first embodiment of the fuel vaporizing attachment 10 of the present invention. The fuel vaporizing attachment 10 includes a fuel conduit 12 disposed between at least one fuel metering device 14 and at least one air intake 16 for enabling passage of fuel there between and a medium 18 for transferring heat energy from a heat source 20 to the fuel conduit 12 such that the conduit 12 is heated and fuel passing therethrough is vaporized prior to entering the air intake 16 of the engine. The fuel conduit 12 includes a fuel inlet 22 to and a fuel outlet 24 from a fuel channel 26.

Preferably, in the first embodiment, the liquid fueled internal combustion engine is a single cylinder engine such as those used to power some motorcycles, mopeds, and motorized tools such as chain saws and weed eaters. The heat source 20 is the engine 34 and the fuel conduit 12 is positioned in close relation to the engine 34 such that heat generated by the engine 34 heats the fuel conduit 12 and the fuel flowing through the fuel channel 20 is vaporized.

As illustrated in FIG. 1, the fuel vaporizing attachment 10 of the preferred embodiment is adapted to be disposed on a conventional lawnmower such that the vaporizing attachment 10 is positioned atop of the engine 34. The fuel metering device 14 is a pointed screw 36 which is tensioned in a through-opening 38 by a spring member 28 to preclude inadvertent loss of the screw 36 during operation of the engine. The air intake 16 includes a butterfly valve 30 and two fuel openings 32, one each disposed on either side of the valve 30. Selective manipulation of the pointed screw 36 controls the amount of fuel flowed to the engine 34. The position of the butterfly valve 30 determines whether the engine is in operation or is idled. Those skilled in the art will recognize that such engines can be fabricated to include one or more fuel openings 32 to the air intake 16 and that the illustration shown is merely exemplary.

In operation, heat energy generated by the engine 34 is removed therefrom by a series of fins 40 extending from the engine 34. The fuel conduit 12 is positioned atop of these fins 40. The points of contact 42 defined by the wall 44 of the fuel conduit 12 communicate with each of the fins 40 of the engine 34 and enable conduction of the heat energy from the engine 34 through the conduit 12 such that the fuel channel 26 is heated. Fuel flows from the gas tank 46, through a fuel tank opening, 48 past the fuel metering device 14 and into the fuel channel inlet 22 of the fuel vaporizing attachment 10. As the fuel is passed through the fuel channel 26, it is vaporized by the heat surrounding the channel 26 and is passed through the fuel conduit outlet 24 into the air intake 16 of the engine. The vaporized fuel is then coursed into engine by the current of air generated in the air intake 16.

The efficacy of the fuel vaporizing attachment 10 is enhanced by employment of a heat conducting compound 50 which optimizes the conduction of heat energy from the heat source 20 to the fuel conduit 12. As also shown in FIG. 1, in this embodiment, the heat conducting compound 50 is disposed between the conduit 12 and the engine 34 such that the heat energy transferred all of the heat emanating from the engine 34 proximate the fuel conduit 12 is conveyed to it through the heat conducting compound 50 and the conduit 12.

The fuel vaporizing attachment 10 is also adaptable for employment in multi-cylinder, liquid fueled internal combustion engines such as those used to power automobiles. Those skilled in the art will recognize that such engines conventionally include a number of heat sources and a number of mediums adaptable for transferring heat energy. The fuel vaporizing attachment 10 of the present invention utilizes a first heat source and a second heat source, a first medium for transferring heat energy from the first heat source to the second heat source, and a second medium for transferring heat energy from the second heat source to fuel passing through the fuel conduit 12 from the fuel metering device 14 to the air intake 16 of the engine.

Figure 8:
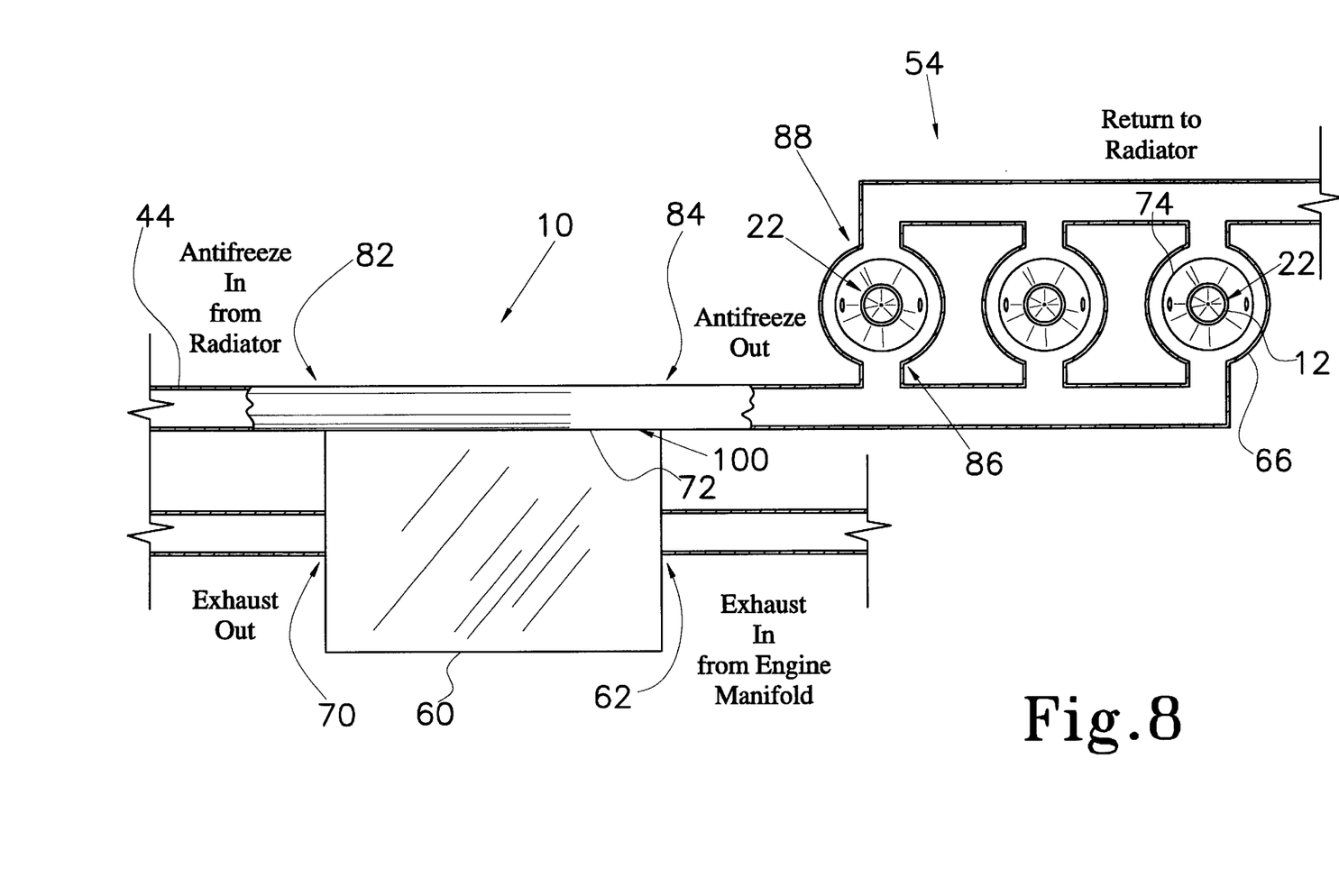
FIG. 8 is a schematic illustration of a fourth embodiment of the fuel vaporizing attachment.
Figure 9:
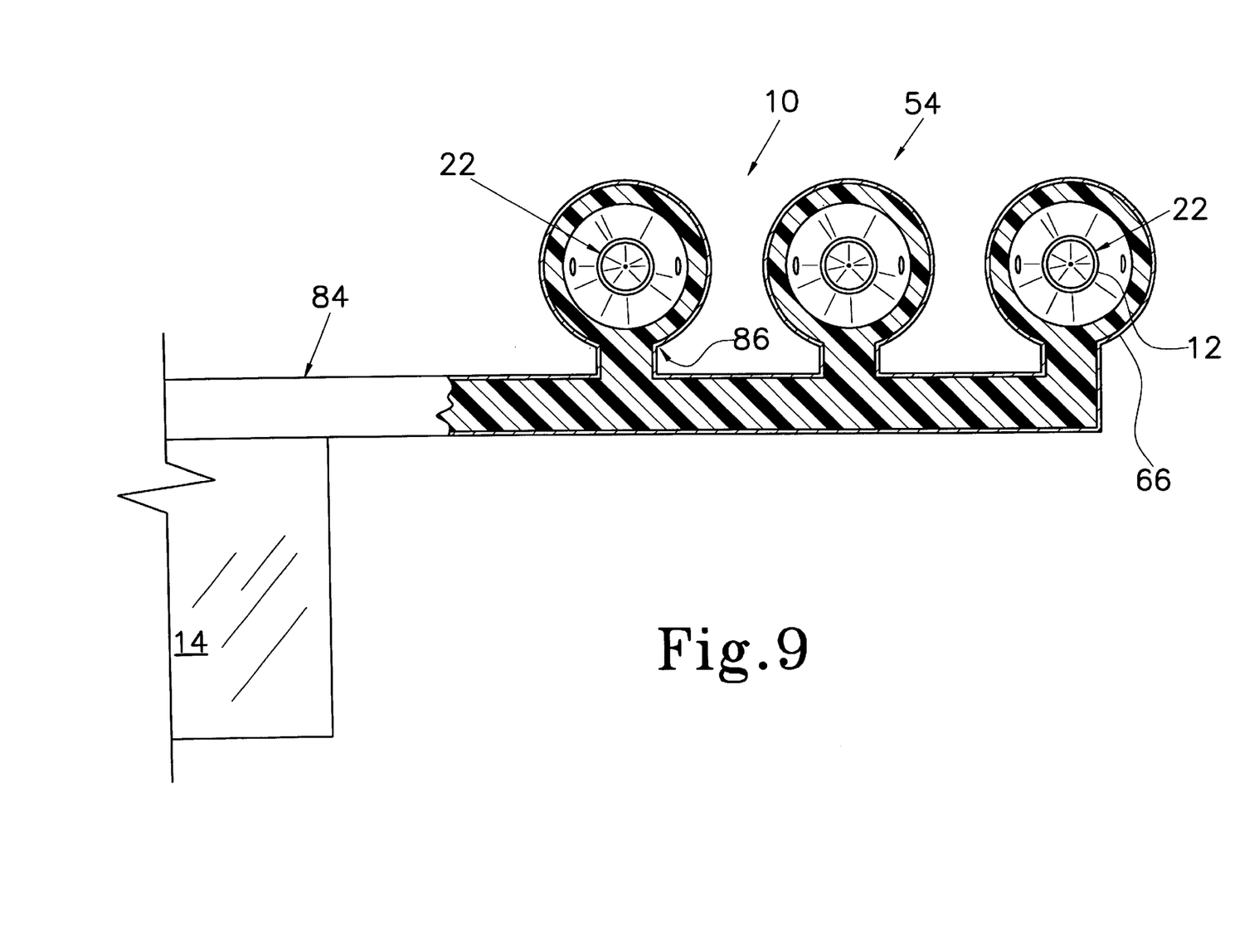
FIG. 9 illustrates another schematic illustration of a fifth embodiment of the fuel vaporizing attachment.
Figure 10:
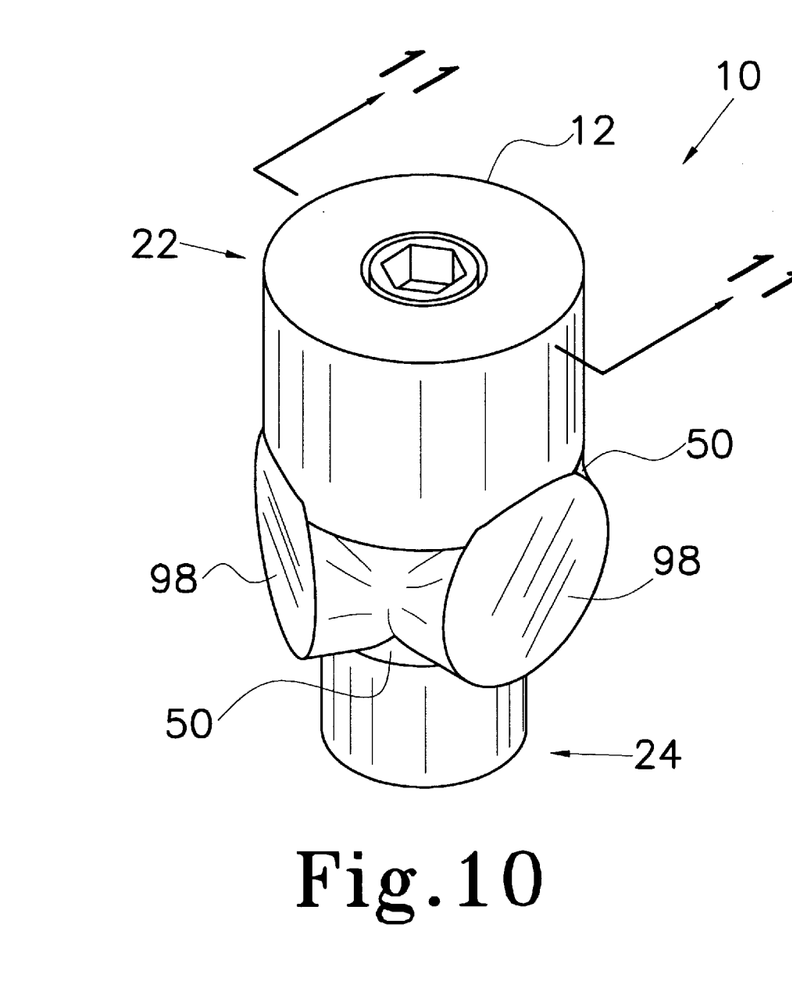
FIG. 10 illustrates a perspective view of a sixth embodiment of the fuel vaporizing attachment.
Figure 11:
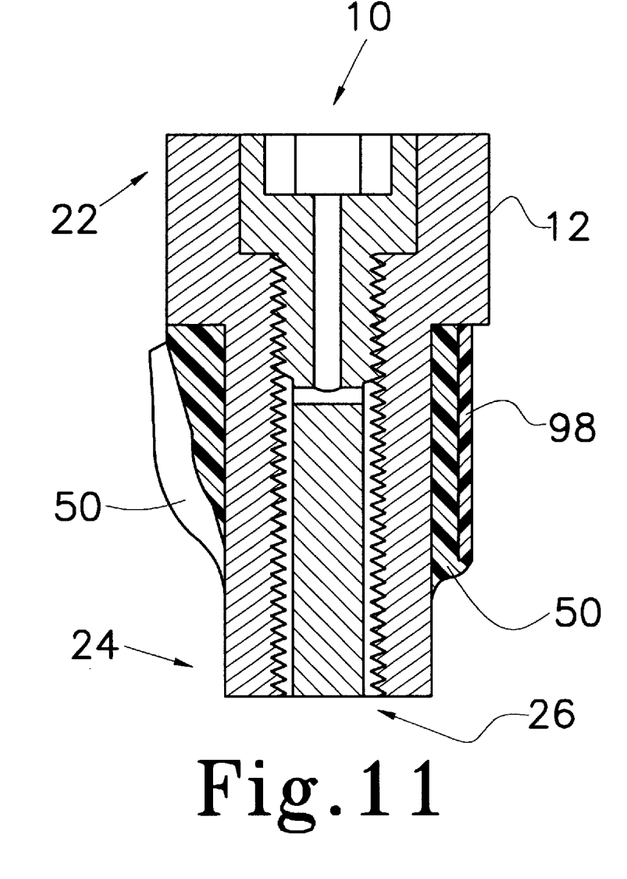
FIG. 11 illustrates a side elevation view, in section, of the fuel vaporizing attachment taken at 11—11 of FIG. 10.

When adapted for use with multi-cylinder engines, the fuel vaporizing attachment 10 is configurable as a compound heat exchanger 52, as is illustrated in FIGS. 2–7, a serial heat exchanger 54 as is shown in FIG. 8, or as a number of individual fuel conduits 12, each having a heat conducting compound 50 disposed about the fuel conduit 12 for transferring heat energy, as depicted in FIGS. 9–11. As those skilled in the art will recognize each embodiment is illustrates different manners of fabricating the fuel vaporizing attachment 10 of the present invention. They will also recognize that none of these embodiments are delimiting of this invention and still other embodiments are equally foreseeable.

Figure 2:
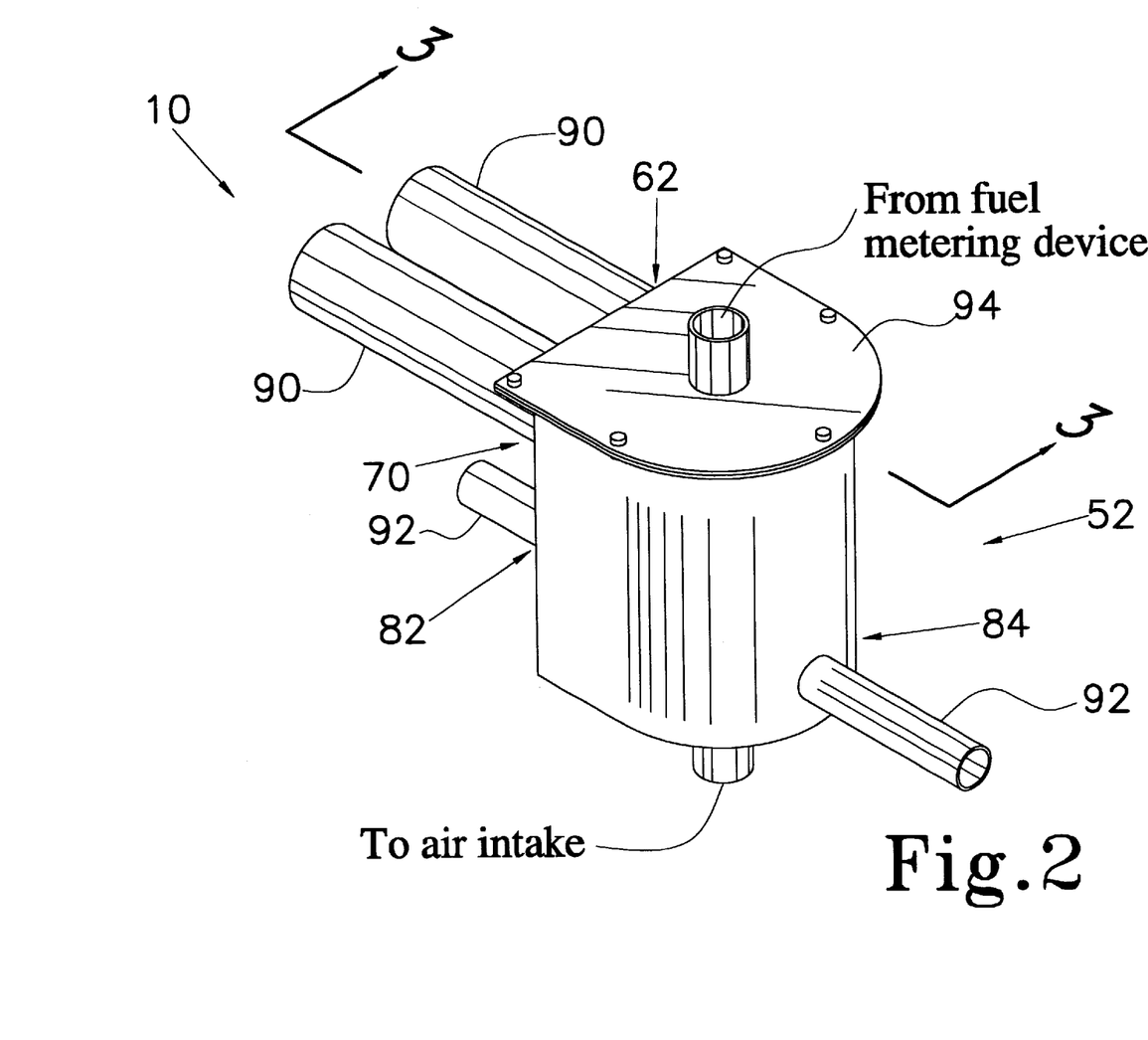
FIG. 2 is a perspective view of a second embodiment of the fuel vaporizing attachment.
Figure 3:
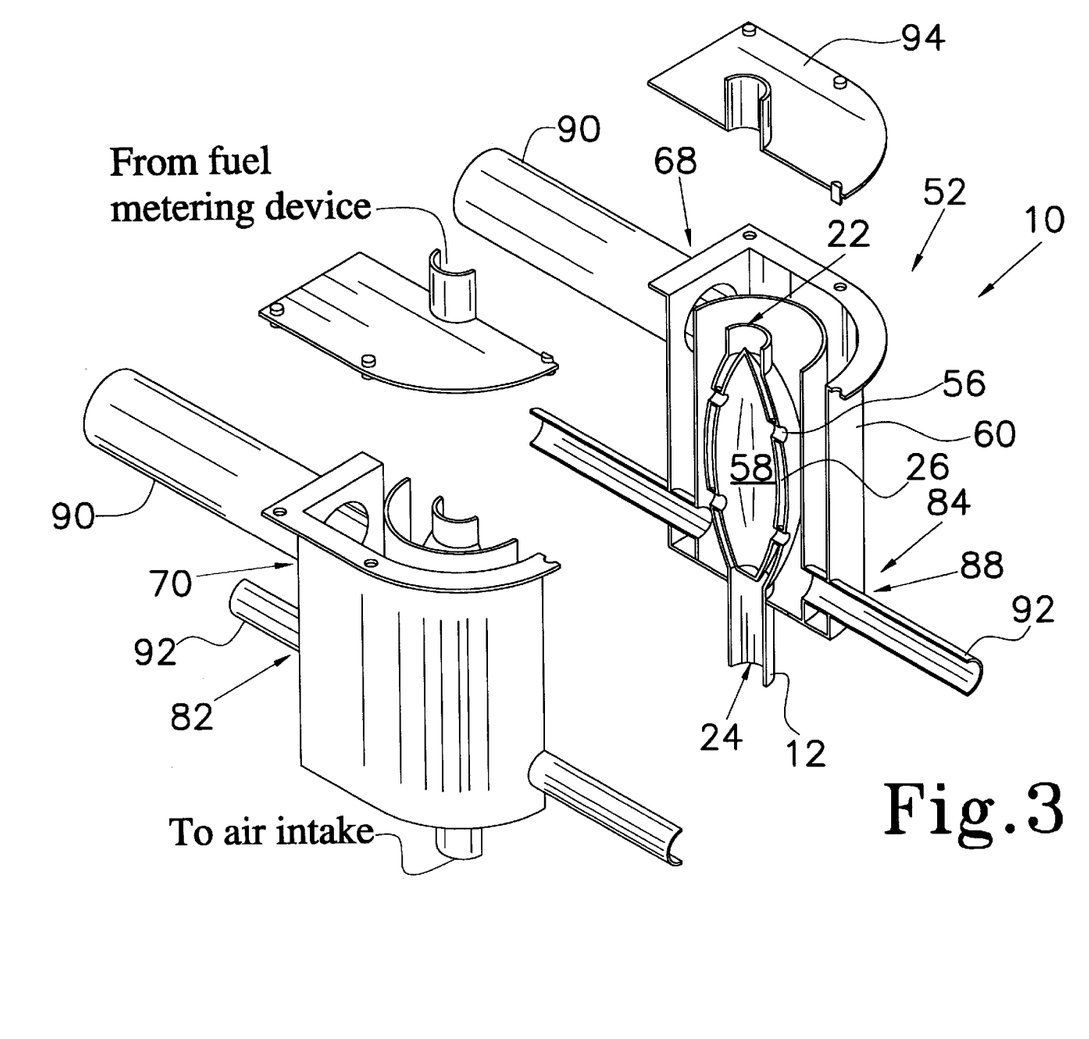
FIG. 3 illustrates a perspective view, in section, of the fuel vaporizing attachment taken at 3—3 of FIG. 1.
Figure 4:
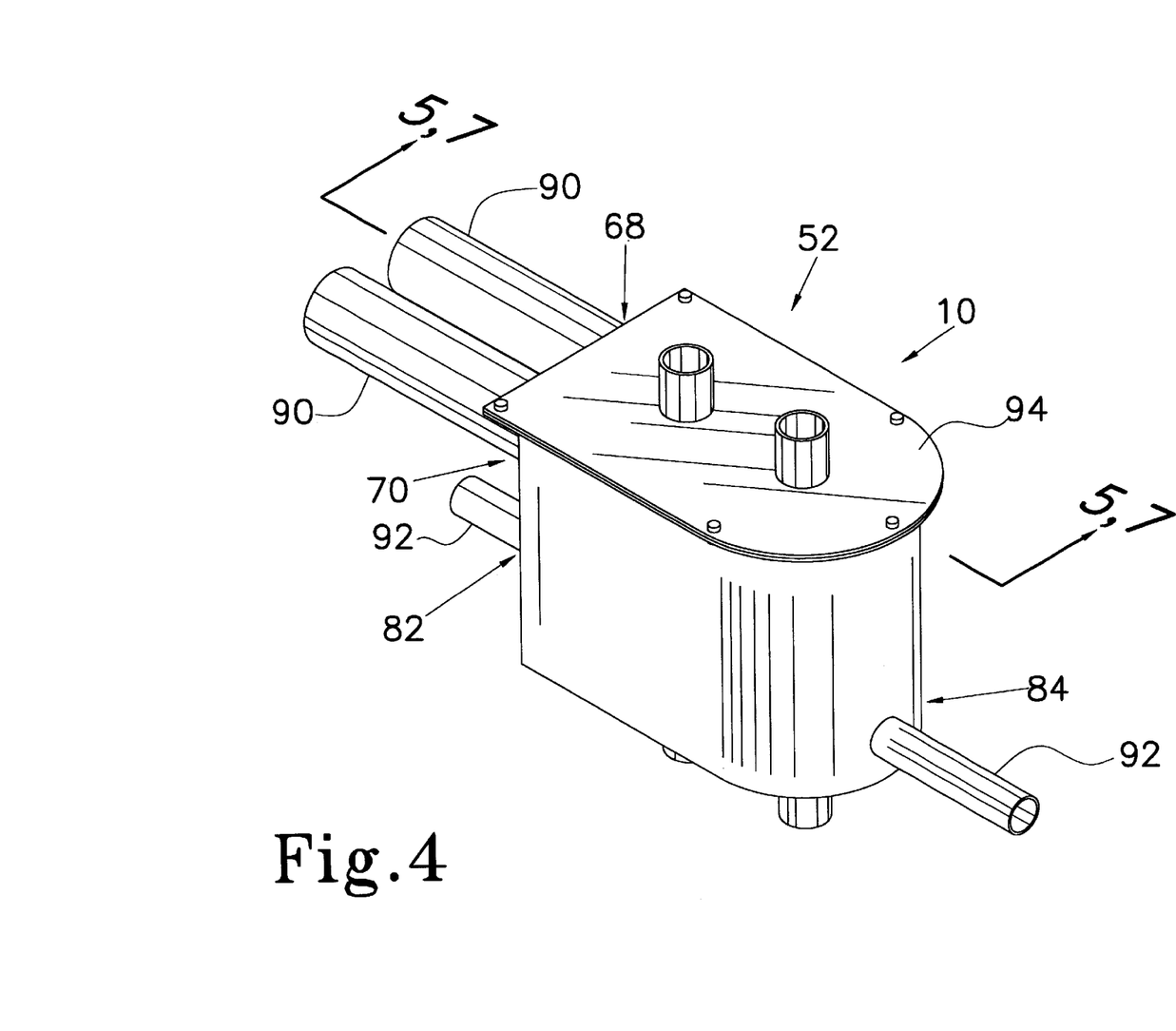
FIG. 4 is a perspective view of a third embodiment of the fuel vaporizing attachment.
Figure 5:
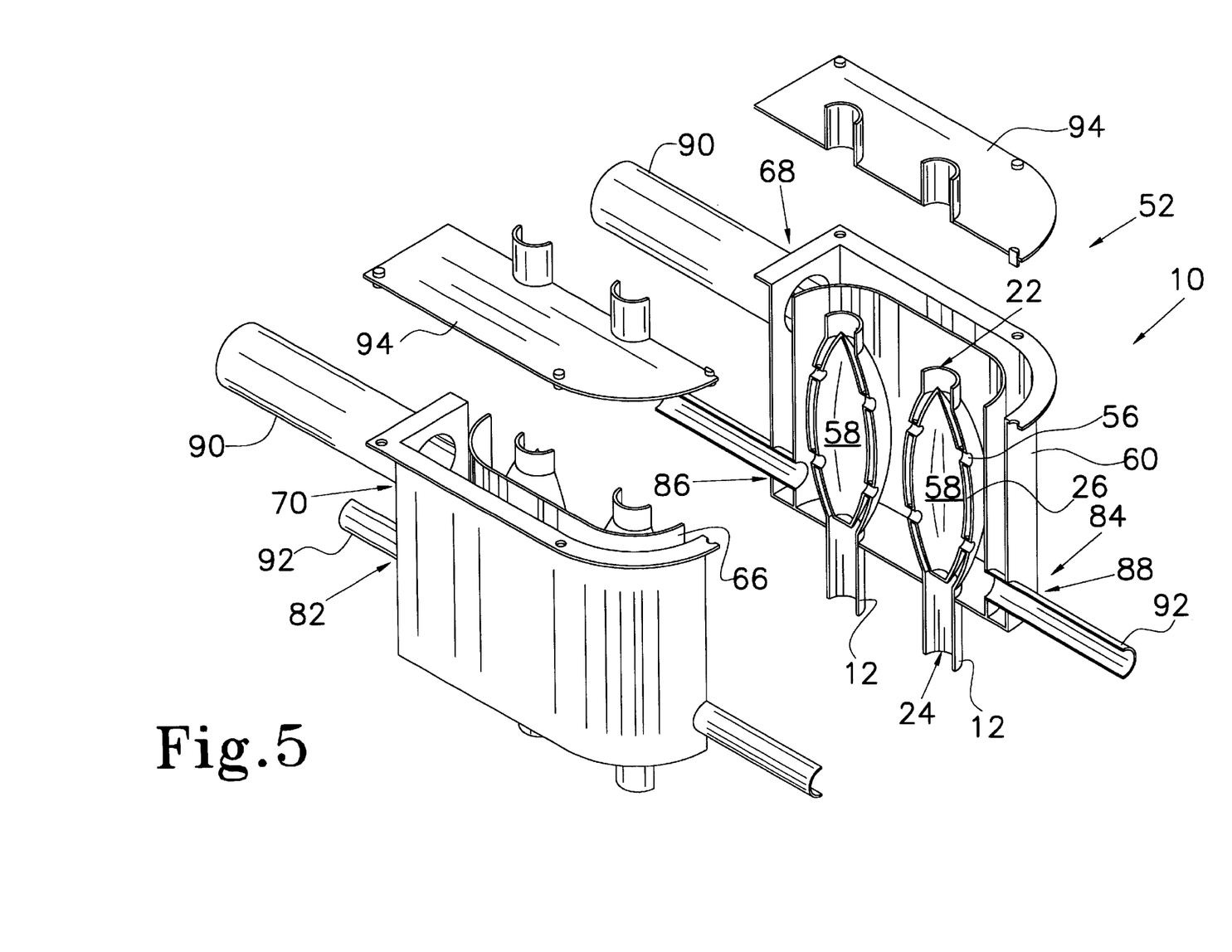
FIG. 5 illustrates a perspective view, in section, of the fuel vaporizing attachment, taken at 5—5 of FIG. 4.
Figure 6:
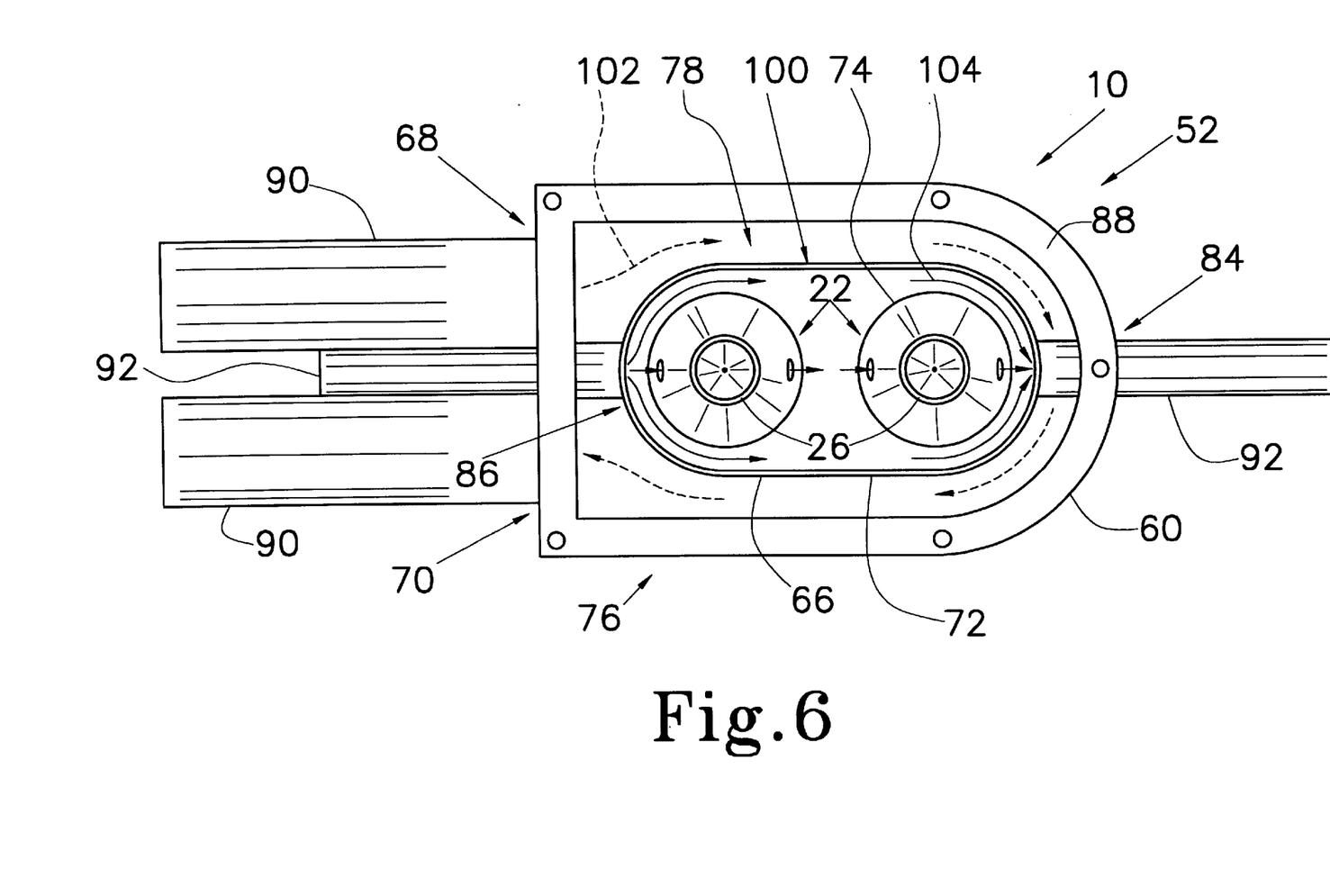
FIG. 6 is a top plan view the third embodiment of the fuel vaporizing attachment shown in FIG. 4.
Figure 7:
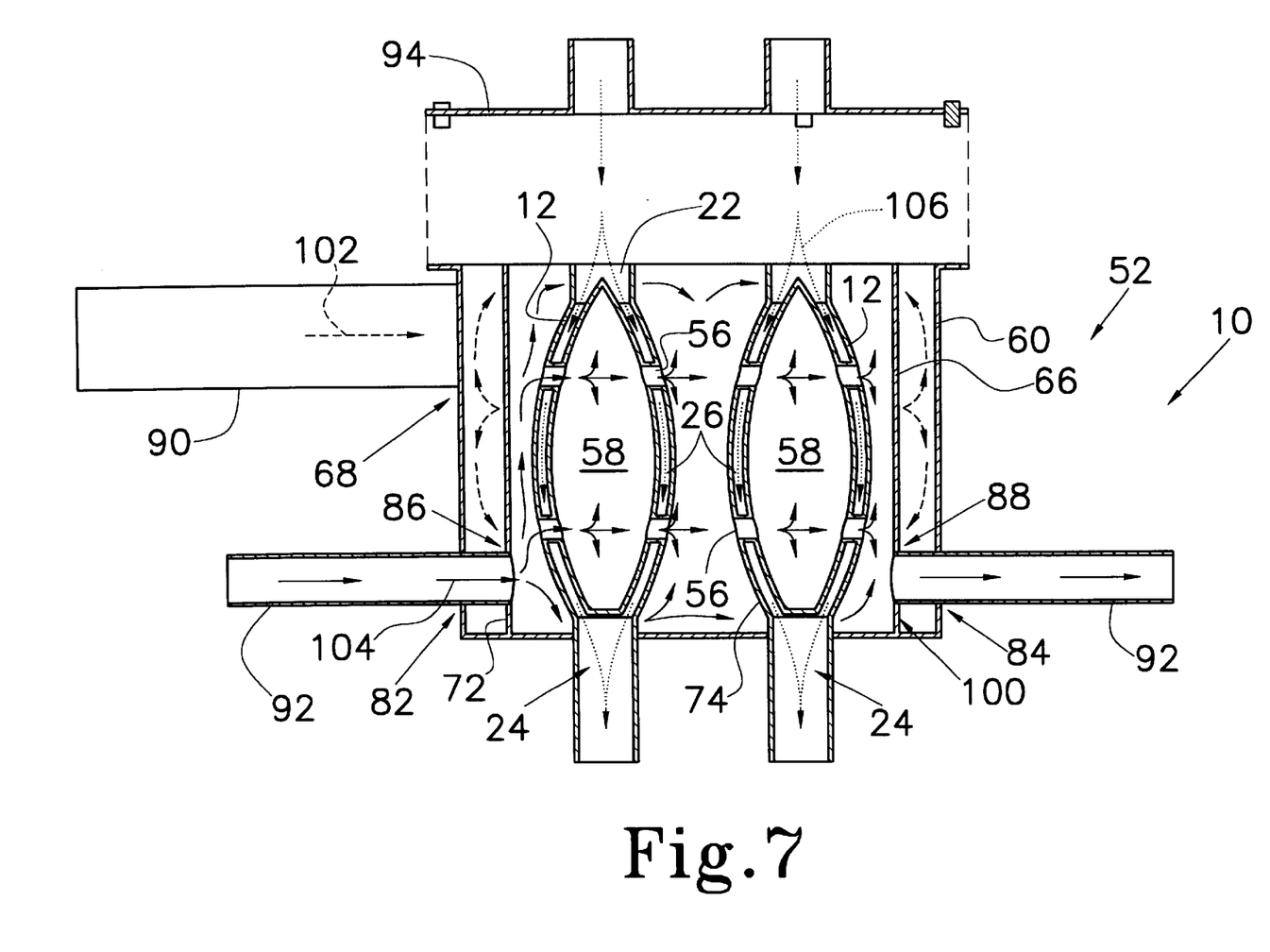
FIG. 7 is a side elevation view, in section, of fuel vaporizing attachment taken at 7—7 of FIG. 4.

FIG. 2 illustrates a perspective view of the fuel vaporizing attachment 10 of the present invention as a compound heat exchanger 52 and FIG. 3 depicts a view of this embodiment, taken in section. As best viewed in FIG. 3, the compound heat exchanger 52 includes a first heat exchanger 76 for transferring heat energy from a first heated medium to a second medium to heat the medium and at least one second heat exchanger 78 for transferring heat energy from the heated second medium to fuel passing through the fuel conduit 12 such that it is vaporized. The compound heat exchanger 52 includes a fuel conduit 12 for conveying fuel from a fuel metering device (not shown) to an air intake (not shown) of the engine. The fuel conduit 12 includes a fuel channel 26 which extends in a generally linear direction from a fuel conduit inlet 22 to a fuel conduit outlet 24, and a medium channel 56 which extends through the conduit 12 in a direction generally orthogonal to the conduit 12 and forces the flow of the second medium around the channel 56, thereby creating heat exchange in the channel 56. The fluid channel 56 defines an interior chamber 58 for permitting an accumulation of the heated second medium within the fuel conduit 12. The accumulation of the heated second medium enables a maximal heating of the fuel channel 56 such that the vaporization of the fuel passing through the fuel channel 56 is optimized.

The first chamber 60 includes a first medium inlet 62 and a first medium outlet 64 for conveying the first medium into and from the first chamber 60. The second chamber 66 includes a first medium inlet 68 and a first medium outlet 70 for conveying the second medium into and from the first chamber 60. The first chamber 60 surrounds at least a portion of the second chamber 66 such that they share a first common wall 72 and that the heat of the first medium is transferred through the first common wall 72 to heat the second medium. The fuel conduit 12 is disposed within the second chamber 66. The second chamber 66 forces the heated, second medium to flow about the fuel conduit 12, and through the medium channel 56 and the interior chamber 58 defined by the fuel conduit 12. The fuel conduit 12 defines a second common wall 74 which is shared by the second heat exchanger 78 such that heat is exchanged from the heated, second medium to the fuel as it passes through the fuel channel 26.

As best viewed in FIG. 3, the first heat exchanger 76 defines a first chamber 60 and a second chamber 66. The second heat exchanger 78 defines a second chamber 66 and third chamber 80. The third chamber 80 defines the fuel channel 26 of the fuel conduit 12. The first chamber 60 is disposed about the second chamber 66 and defines a second inlet 82 and a second outlet 84 for receiving the second chamber inlet 86 and the second chamber outlet 88, respectively. The wall 100 of the second chamber 66 defines the first common wall 72 for exchanging heat between the first and second mediums carried by the first and second chambers 60, 66, respectively.

In the operation, a first medium conveyer 90 carries a preferred first heated medium, such as exhaust gas, to the first chamber 60 from the exhaust manifold of the engine's exhaust system. A second medium conveyer 92 carries a preferred second heated medium, such as antifreeze, through the first chamber 60 and into the second chamber 66 from the radiator of the engine. As the heated exhaust gases are conveyed to the first chamber 60 in a manner illustrated by arrow 102 in FIGS. 6 and 7, they are forced about the first chamber 60 and bathe the heated antifreeze being conveyed through the second chamber 66 in a manner shown by arrow 104 in FIGS. 6 and 7. Heat energy from the exhaust gas is absorbed by the antifreeze through the first common wall 72 and super-heats the antifreeze. The super-heated antifreeze is of sufficient temperature to vaporize fuel passing through the fuel channel 26 of the fuel conduit 12 in a manner shown by arrow 106 in FIG. 7. The exhaust gases are passed through the first medium outlet 64 and returned to the manifold by the first medium conveyer 90. Antifreeze is passed through the first medium outlet 66 of the second chamber and returned to the radiator by the second medium conveyer 92.

FIGS. 4–7 enable those skilled in the art to visualize the adaptation of the fuel vaporizing attachment 10 of the present invention to diverse applications. Those skilled in the art will recognize that the compound heat exchanger 52 is adaptable to incorporate any number of fuel conduits 12 within its assembly. Accordingly, it is foreseeable that the present invention can be fabricated to include two fuel conduits 12. It is also foreseeable that the present invention is fabricated wherein groups of three, four and six fuel conduits 12 are included in a single attachment 10 so that the fuel vaporizing attachment 10 is adaptable to the engine application desired.

As disclosed in the figures, the compound heat exchanger 52 adaptation of fuel vaporizing attachment 10 further includes a removably securable cover 94 for defining a closure to the chambers described above. It is foreseeable, however, that the fuel vaporizing attachment 10 is fabricated such that the cover 94 is integrally formed with the attachment 10. A cover 94 of diverse designs is equally foreseeable.

FIG. 8 is a schematic illustration of the fuel vaporizing attachment 10 as a serial heat exchanger 54. In this embodiment, the fuel vaporizing attachment 10 includes a first heat exchanger 76 and a series of second heat exchangers 78 and each exchanger includes a first chamber 60 and a second chamber 66. The first heat exchanger 76 is disposed proximate the motor's exhaust manifold. The exhaust manifold defines the first chamber 60 of the first heat exchanger 76. The first heat exchanger 76 is defined by the exhaust manifold, the second medium conveyer 92 and a first common wall 72 therebetween. The second medium conveyer 92 defines the second chamber 66. The second medium conveyer 92 extends from the radiator of the engine, runs closely parallel the exhaust manifold, and carries the heated antifreeze to the series of second heat exchangers 78. Heat energy is transferred from the exhaust gas through the first common wall 72 to super-heat the antifreeze as it is conveyed to the series of second heat exchangers 78.

The series of second heat exchangers 78 are disposed, one each, proximate each air intake 12 of the combustion engine. A fuel conduit 12, as described above, is included one each in each of the second heat exchangers 78. Each second heat exchanger 78 defines the first chamber 60 and each fuel conduit 12 disposed within each second heat exchanger 78 defines the second chamber 66. The fuel conduit 12 defines the second common wall 74 whereby heat is transferred from the super-heated antifreeze to the fuel.

In operation of the serial heat exchanger 78, heated exhaust gases from the engine are conveyed from the first medium conveyer 90 and forced into the exhaust manifold 96. Heated antifreeze is carried from the radiator passed the exhaust manifold 96 by the second medium conveyer 92, super-heated by the heat exchange that occurs at first common wall 72 and carried to the series of second heat exchangers 78. The antifreeze is received in first chamber 60 of each second heat exchanger 78 through each corresponding first medium inlet 68. Within the first chamber 60, the antifreeze is circulated about each second chamber 66, then returned to the engine's radiator through each corresponding first medium outlet 70. As the super-heated antifreeze is passed through each second chamber 66, it is forced through each medium channel 56 and into the interior chamber 58 where its heat energy is transferred through the second common wall 74 to the fuel traveling in the fuel channel 26 such that the fuel is uniformly and completely vaporized.

When used in combination with a heat conducting compound 50, the serial heat exchanger 54 is also adaptable to diverse alternative configurations. As shown in FIG. 9, in one alternative embodiment, the serial heat exchanger 54 is configurable such that the second medium conveyer 92 remains closely aligned to a heat source and extends between the heat source and the series of second heat exchangers 78. In this embodiment, the heat conducting compound 50 is disposed within the second medium conveyer 92 and about the fuel conduit 12 positioned within each of the series of second heat exchangers 78. In the embodiment shown, the heat source is the exhaust manifold 96.

In operation, as exhaust gas is generated by the engine it fills, and its heat energy heats, the manifold 96. The heat energy from the exhaust gas passes through the first common wall 72 defined by the points of contact between the exhaust manifold 96 and the second medium conveyer 92 and is absorbed by the heat conducting compound 50, The heat conducting compound 50 carries the heat energy to each of the fuel conduit 12 in each of the series of second heat exchangers 78 and fuel passing through each of the fuel channels 26 of each fuel conduit 12 is vaporized prior to entering the air intake of the engine. As those skilled in the art will recognize, the radiator or any other suitable heat generating component of the internal combustion engine is equally adaptable as the heat source for use in this alternative embodiment.

As exemplified by the fuel conduit shown in FIGS. 10 and 11, in a second alternative embodiment, each fuel conduit 12 of the serial heat exchanger 54 is surrounded by heat conducting compound 50 and at least one contact 98 is received in the compound 50. The heat source is electrical, such as a battery (not shown) as is conventionally utilized in an internal combustion engine, and the second medium conveyer 92 is at least one electrical wire (not shown) which extends from the battery to each at least one contact 98. In operation, when the engine is started, electrical current is generated and carried to each electrical contact 98 by each at least one electrical wire. Preferably, each at least one electrical contact 98 is ceramic such that its conductive capacity is enhanced. It will be recognized, however, that the contact may be fabricated from other suitable materials. The resistance in the ceramic contact 98 converts the electrical energy received to heat energy and the heat energy is transmitted to the fuel conduit 12 through the heat conducting compound 50 such that the fuel channel 26 is heated and fuel passing through each fuel channel 26 is vaporized prior to entering the air intake of the engine.

Those skilled in the art will appreciate that the fuel vaporizing attachment 10 of the present invention is adaptable for use in fuel-injected, liquid fueled internal combustion engine, as well as those described above. When utilized with fuel injected engines, each fuel vaporizing attachment 10 is disposable between each fuel injector and each air intake of the engine, respectively, without the necessity of modification.

From the foregoing description, it will be recognized by those skilled in the art that a fuel vaporizing attachment 10 offering advantages over the prior art has been provided. Specifically, the fuel vaporizing attachment 10 completely vaporizes liquid fuel before the fuel is supplied to the air flow of the engine so that fuel is more completely combusted, fuel efficiency is increased and the emission of harmful pollutants is reduced. It is easily adaptable retrofittable to diverse types of engines, including which are fuel injected as well as those which are non-fuel injected, as are presently constructed. The fuel vaporizing attachment 10 is adaptable for vaporizing fuels in engines, regardless of the type of conventional or alternative fuel used.

Moreover, it is simple and economical to construct.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A fuel vaporizing attachment for vaporizing fuels used to power a liquid fueled internal combustion engine, the engine including at least one fuel line, at least one air passage, at least one heat source and at least one cylinder, said fuel vaporizing attachment comprising:

a housing adapted to be removably mounted on a liquid combustion engine between at least one fuel line and at least one air passage, said housing defining at least one fuel conduit to establish fluid communication of fuel between the at least one fuel line and the at least one air passage and at least one medium for transferring heat energy from the at least one heat source to said at least one fuel conduit such that said fuel conduit is heated and fuel within said fuel conduit is heated to induce vaporization upon exit from said fuel conduit and prior to contacting and mixing with air passing through the at least one air passage.

2. The fuel vaporizing attachment of claim 1 wherein each said at least one fuel conduit defines at least one fuel inlet to and at least one fuel outlet from at least one fuel channel.

3. The fuel vaporizing attachment of claim 2 wherein the internal combustion engine is a single cylinder engine and the heat source is the engine, said at least one fuel conduit being disposed proximate the engine such that heat energy generated by the engine heats said at least one fuel conduit to vaporize fuel flowing therethrough.

4. The fuel vaporizing attachment of claim 3 further including a heat conducting compound for facilitating conduction of heat energy, said heat conducting compound being disposed on the single cylinder engine between the engine and said at least one fuel conduit, heat energy being transferred to said heat conducting compound and said at least one fuel conduit such that fuel passing through said fuel channel is optimally vaporized.

5. The fuel vaporizing attachment of claim 2 wherein said vaporizing attachment includes a first heat source and a second heat source and a first medium for transferring heat energy from the first heat source to the second heat source and a second medium for transferring heat energy from the second heat source to fuel passing through said fuel channel from the at least one fuel metering device to the at least one air intake of the internal combustion engine, the first medium being a first heat exchanger and the second medium being at least one second heat exchanger.

6. The fuel vaporizing attachment of claim 5 wherein said first heat exchanger includes a first medium inlet and a first medium outlet to a first chamber and a second medium inlet and a second medium outlet to a second chamber, said at least one second heat exchanger includes said second chamber and said at least one fuel conduit is received within said second chamber, at least a portion of said at least one second heat exchanger being received in said first heat exchanger, said first heat exchanger defining a first wall common to said first chamber and said second chamber such that heat is transferred from the first medium to the second medium, said second heat exchanger defining at least one second wall common to said second chamber and said fuel conduit such that heat is transferred from the second medium to the fuel as it passes through said fuel channel and the fuel is vaporized.

7. The fuel vaporizing attachment of claim 6 wherein said first wall is disposed within said first chamber and each said at least one second wall is disposed within said first wall, said second chamber is defined between said first wall and each said at least one second wall, and each said at least one second wall is defined by at least a portion of each said at least one fuel conduit disposed within said second chamber.

8. The fuel vaporizing attachment of claim 7 wherein each said at least one fuel conduit further includes at least one channel extending through said at least one fuel conduit in a direction generally orthogonal to said conduit, said at least one fuel channel defining an interior chamber for enabling passage of heat energy therethrough such that said at least one fuel channel is surrounded by said heat energy as said heat energy is passed through said fuel vaporizing attachment.

9. The fuel vaporizing attachment of claim 8 wherein the engine includes an exhaust manifold for housing exhaust gases generated from operation of the internal combustion engine and a radiator for housing antifreeze used for removing heat generated in operation of the internal combustion engine and said fuel vaporizing attachment includes two heat sources, a first heat source being the exhaust gas housed in the exhaust manifold and a second heat source being the antifreeze housed in the radiator, the exhaust gas being conveyed to and from said at least one first heat exchanger through a first medium conveyer, the antifreeze being conveyed to and from said second heat exchanger through a second medium conveyer, the heat energy transference from the exhaust gas through said first wall heating the antifreeze and the heat energy transference from the heated antifreeze through the second wall super-heating the fuel such that it is completely vaporized.

10. The fuel vaporizing attachment of claim 9 wherein the engine includes a plurality of air intakes and said fuel vaporizing attachment includes a second heat exchanger received within said first heat exchanger and a plurality of fuel conduits received within said second heat exchanger, said second heat exchanger defining said second chamber, one each of said fuel conduits being positioned proximate to one each of the plurality of air intakes.

11. The fuel vaporizing attachment of claim 10 wherein the engine further includes a plurality of fuel injectors and one each of said plurality of fuel conduits corresponds to one each of the plurality of fuel injectors such that fuel is injected from each fuel injector through each said corresponding fuel conduit and is vaporized prior to entering the each of the plurality of air intakes of the engine.

12. The fuel vaporizing attachment of claim 9 wherein the engine includes a plurality of air intakes and said fuel vaporizing attachment includes a plurality of second heat exchangers and a plurality of fuel conduits positioned proximate the plurality of air intakes of the engine, each said plurality of second heat exchangers being arranged in series within said first heat exchanger, one each of said plurality of second heat exchangers corresponding to one each of the plurality of air intakes, one each of said plurality of fuel conduits being received within one each of said plurality of said second heat exchangers, each of said plurality of second heat exchangers defining a plurality of second chambers.

13. The fuel vaporizing attachment of claim 12 wherein the engine further includes a plurality of fuel injectors and one each of said plurality of fuel conduits corresponds to one each of the fuel injectors such that fuel is injected from each fuel injector through each said corresponding fuel conduit and is vaporized prior to entering each of the plurality of air intakes of the engine.

14. The fuel vaporizing attachment of claim 5 wherein said first heat exchanger includes a first medium inlet and a first medium outlet to a first chamber and a second medium inlet and a second medium outlet to a second chamber and each said at least one second heat exchanger includes a first medium inlet and a first medium outlet to a third chamber and said at least one fuel conduit, each said at least one fuel conduit defining at least one fuel inlet to and at least one fuel outlet from at least one fuel channel, said first heat exchanger defining a first wall common to said first chamber and said second chamber such that heat is transferred from the first medium to the second medium, said at least one fuel conduit defining at least one second wall common to said third chamber and said at least one fuel channel such that heat from the second medium is transferred to the fuel.

15. The fuel vaporizing attachment of claim 14 wherein said first wall is disposed within said first chamber and said second wall is disposed within each said third chamber, said first wall being defined by said first chamber and at least a portion of said second chamber, each said second wall being defined by at least a portion of said third chamber and at least a portion of each said fuel channel.

16. The fuel vaporizing attachment of claim 15 wherein each said at least one fuel conduit further includes at least one channel extending through said fuel conduit in a direction generally orthogonal to said conduit, said at least one fuel channel defining an interior chamber for enabling passage of heat energy into and through said fuel conduit such that said fuel channel is surrounded by said heat energy of the heat source as said heat energy is passes through said fuel vaporizing attachment.

17. The fuel vaporizing attachment of claim 16 wherein the engine includes an exhaust manifold for housing exhaust gases generated from operation of the internal combustion engine and a radiator for housing antifreeze used for removing heat generated in operation of the internal combustion engine and said fuel vaporizing attachment includes two heat sources, a first heat source being the exhaust gas housed in the exhaust manifold and a second heat source being the antifreeze housed in the radiator, the exhaust gas being conveyed to and from said at least one first heat exchanger through a first medium conveyer, the antifreeze being conveyed to and from said second heat exchanger and to and from said third heat exchanger through at least one second medium conveyer, the heat energy transference from the exhaust gas through said first wall heating the antifreeze and the heat energy transference from the heated antifreeze through said second wall super-heating the fuel such that it is completely vaporized.

18. The fuel vaporizing attachment of claim 17 wherein the engine includes a plurality of air intakes and said fuel vaporizing attachment includes a series of second heat exchangers and a plurality of fuel conduits positioned one each in each second heat exchanger of said series of second heat exchangers, said first heat exchanger having a first medium conveyer extending to and from said first chamber and a second medium conveyer extending to and from said second chamber to each said third chamber of said series of second heat exchangers, said first medium conveyer extending from the exhaust manifold to said first medium inlet and from said first medium outlet of said first chamber to the exhaust manifold, said second medium conveyer extending from the radiator to said second medium inlet of said second chamber and from said second medium outlet of said second chamber to and from each said first medium inlet and said first medium outlet of each said third chamber back to the radiator, one each of said second heat exchangers being positioned proximate to one each of the plurality of air intakes such that fuel passing through each said fuel conduit is vaporized prior to entering each of the plurality of air intakes of the engine.

19. The fuel vaporizing attachment of claim 18 wherein the engine further includes a plurality of fuel injectors and one each of said plurality of fuel conduits corresponds to one each of the fuel injectors such that fuel is injected from each fuel injector through each said corresponding fuel conduit and is vaporized prior to entering each of the plurality of air intakes of the engine.

20. The fuel vaporizing attachment of claim 1 wherein the engine includes a battery to generate an electrical current for powering the internal combustion engine, the heat source is the battery, said medium for transferring heat energy is a heat conducting compound disposed about said at least one fuel conduit and said fuel vaporizing attachment further includes at least one electrical contact received in said heat conducting compound, said at least one electrical contact for receiving the electrical current from the battery and having sufficient resistance to convert the electrical current to heat energy for heating said heat conducting compound and said at least one fuel conduit such that the fuel passing through said fuel channel is vaporized.

21. The fuel vaporizing attachment of claim 20 wherein the engine includes a plurality of air passages and said fuel vaporizing attachment includes a plurality of fuel conduits, one each of said fuel conduits being disposed proximate one each of the air passages such that fuel passing from the fuel line through each one of said plurality of fuel conduits is vaporized prior to entering each of the plurality of air passages of the engine.

22. The fuel vaporizing attachment of claim 20 wherein the engine further includes a plurality of fuel injectors positioned one each proximate one each of the plurality of air passages and said fuel vaporizing attachment includes a plurality of fuel conduits, one each of said plurality of fuel conduits being disposed between one each of the plurality of fuel injectors and one each of the plurality of air intakes such that fuel passing through each said fuel injector is injected through each said fuel channel of each said corresponding fuel conduit and is vaporized prior to entering each of the plurality of air passages of the engine.

23. The fuel vaporizing attachment of claim 1 wherein the engine includes an exhaust manifold for housing exhaust gases generated from operation of the internal combustion engine, the heat source is the exhaust gas, said medium for transferring heat energy is a heat conducting compound and said fuel vaporizing attachment further includes at least one heat conducting compound conduit extending from the exhaust manifold to said at least one fuel conduit, said heat conducting compound being disposed within said heat conducting compound conduit and about said at least one fuel conduit to enable the transfer of heat energy from the exhaust gas to and through said heat conducting compound to heat said at least one fuel conduit such that fuel passing through said fuel channel is vaporized.

24. The fuel vaporizing attachment of claim 23 wherein the engine includes a plurality of air intakes and said fuel vaporizing attachment includes a plurality of fuel conduits and a plurality of heat conducting compound conduits extending between the exhaust manifold and each of said plurality of fuel conduits, one each of said plurality of fuel conduits being disposed proximate one each of the plurality of air intakes such that fuel passing from the fuel metering device through one each of said corresponding fuel conduits is heated and vaporized prior to entering one each of the plurality of air intakes of the engine.

25. The fuel vaporizing attachment of claim 23 wherein the engine includes a plurality of air intakes and a plurality of fuel injectors positioned one each proximate each of the plurality of air intakes and said fuel vaporizing attachment includes a plurality of fuel conduits and a plurality of heat conducting compound conduits extending between the exhaust manifold and each of said plurality of fuel conduits, one each of said plurality of fuel conduits being positioned between one each of said plurality of fuel injectors and the air intakes such that fuel passing through each fuel injector is injected through each said corresponding fuel conduit is heated and vaporized prior to entering each of the plurality of air intakes of the engine.

26. The fuel vaporizing attachment of claim 1 wherein the engine includes a radiator for housing antifreeze used for removing heat generated in operation of the internal combustion engine, the heat source is the antifreeze, said medium for transferring heat energy is a heat conducting compound and said fuel vaporizing attachment further includes at least one heat conducting compound conduit extending from the radiator to said at least one fuel conduit, said heat conducting compound being disposed within said heat conducting compound conduit and about said at least one fuel conduit to enable the transfer of heat energy from the antifreeze to and through said heat conducting compound to heat said at least one fuel conduit such that the fuel passing through said fuel channel is vaporized.

27. The fuel vaporizing attachment of claim 26 wherein the engine includes a plurality of air intakes and said fuel vaporizing attachment includes a plurality of fuel conduits and a plurality of heat conducting conduits extending between the radiator and each of said plurality of fuel conduits, one each of said plurality of fuel conduits being disposed proximate one each of the plurality of air intakes such that fuel passing from the fuel metering device through one each of said plurality of fuel conduits is heated and vaporized as it passes into one each of the plurality of air intakes of the engine.

28. The fuel vaporizing attachment of claim 26 wherein the engine includes a plurality of air intakes and a plurality of fuel injectors disposed one each proximate each of the plurality of air intakes and said fuel vaporizing attachment includes a plurality of fuel conduits and a plurality of heat conducting conduits extending between the radiator and each of said plurality of said fuel conduits, one each of said plurality of fuel conduits being disposed between one each of said plurality of fuel injectors and air intakes such that fuel passing from each fuel injector is injected through each said corresponding fuel conduit and is heated and vaporized prior to entering one each of the plurality of air intakes of the engine.

29. A fuel vaporizing attachment for vaporizing fuels used to power a liquid fueled internal combustion engine, the engine including at least one fuel line, at least one air passage, at least one heat source and at least one cylinder, said fuel vaporizing attachment comprising:

a housing adapted to be removably mounted on a liquid combustion engine between at least one fuel line and at least one air passage, said housing defining at least one fuel conduit to establish fluid communication of fuel between the at least one fuel line and the at least one air passage, said at least one fuel conduit defining at least one fuel inlet to and at least one fuel outlet from at least one fuel channel, the heat source being the engine, said fuel conduit being positioned proximate the engine; and a heat conducting compound for transferring heat energy from the engine to said at least one fuel conduit, said heat conducting compound being disposed on the engine between the engine and said at least one fuel conduit for enhancing the transfer of heat energy from the engine to said at least one fuel conduit such that said fuel conduit is heated and fuel within said conduit is heated to induce vaporization upon exit from said fuel conduit and prior to contacting and mixing with air passing through the air passage of the engine.

* * * * *